US009018940B2

(12) United States Patent
Mizutani et al.

(10) Patent No.: US 9,018,940 B2
(45) Date of Patent: Apr. 28, 2015

(54) BICYCLE ROTATION DETECTING DEVICE

(75) Inventors: Yuta Mizutani, Osaka (JP); Takumi Onogi, Osaka (JP)

(73) Assignee: Shimano Inc., Osaka (JP)

( * ) Notice: Subject to any disclaimer, the term of this patent is extended or adjusted under 35 U.S.C. 154(b) by 352 days.

(21) Appl. No.: 13/535,930

(22) Filed: Jun. 28, 2012

(65) Prior Publication Data
US 2014/0002060 A1 Jan. 2, 2014

(51) Int. Cl.
*G01P 3/44* (2006.01)
*B62J 6/02* (2006.01)
*G01C 22/00* (2006.01)
*G01P 3/481* (2006.01)
*B62J 99/00* (2009.01)

(52) U.S. Cl.
CPC .............. *B62J 6/02* (2013.01); *G01C 22/002* (2013.01); *G01P 3/481* (2013.01); *B62J 2099/002* (2013.01); *B62J 2099/0013* (2013.01)

(58) Field of Classification Search
CPC ...... B62M 25/08; H02K 7/1846; B62J 6/001; G01P 3/44
USPC ................................. 324/160–180; 327/67 A
See application file for complete search history.

(56) References Cited

U.S. PATENT DOCUMENTS

| 6,573,686 | B2 | 6/2003 | Uno |
| 6,605,884 | B2 | 8/2003 | Nishimoto |
| 7,119,668 | B2 * | 10/2006 | Kitamura et al. ............. 340/432 |
| 7,410,278 | B2 | 8/2008 | Kitamura |
| 7,785,156 | B1 | 8/2010 | Liao et al. |
| 2005/0067203 | A1 | 3/2005 | Uno |
| 2005/0285461 | A1 * | 12/2005 | Kitamura et al. ........... 310/67 A |
| 2007/0014120 | A1 * | 1/2007 | Kitamura ...................... 362/473 |
| 2008/0101079 | A1 * | 5/2008 | Kitamura ...................... 362/473 |
| 2011/0156543 | A1 | 6/2011 | Nakano |

FOREIGN PATENT DOCUMENTS

| DE | 20 2006 008 279 U1 | 12/2006 |
| DE | 20 2004 021 548 U1 | 1/2009 |
| DE | 20 2009 016 577 U1 | 5/2011 |
| DE | 202011107127 U1 | 4/2012 |
| EP | 0516113 A2 | 12/1992 |
| EP | 0645868 A2 | 3/1995 |
| JP | 2000-249752 A | 9/2000 |
| JP | 2003-35764 A | 2/2003 |
| JP | 2003-35765 A | 2/2003 |
| JP | 2003-57331 A | 2/2003 |

* cited by examiner

*Primary Examiner* — Arleen M Vazquez
*Assistant Examiner* — Brent J Andrews
(74) *Attorney, Agent, or Firm* — Global IP Counselors

(57) ABSTRACT

A bicycle rotation detecting device is provided with a first electrical connector, a second electrical connector, a rotation detecting circuit and an output part. The second electrical connector is electrically connected to the first electrical connector by an electrical path. The rotation detecting circuit detects a waveform of alternating current in the electrical path and produces a rotation detection signal. The output part is electrically connected to the rotation detecting circuit. The output part outputs either the rotation detection signal of the rotation detecting circuit or a signal based on the rotation detection signal of the rotation detecting circuit.

15 Claims, 6 Drawing Sheets

BICYCLE ROTATION DETECTING DEVICE

BACKGROUND

1. Field of the Invention

This invention generally relates to a bicycle rotation detecting device. More specifically, the present invention relates to a bicycle rotation detecting device that can be used to detect a rotation state of a bicycle part (e.g., a bicycle wheel).

2. Background Information

Sometimes, a cyclometer is mounted on a bicycle to show the rotation state of a wheel, such as number of rotations of a wheel or a traveling speed of the bicycle. In order for the cyclometer to show the rotation state, a signal indicating information such as the number of rotations of a wheel has to be acquired by the cyclometer. In order to acquire such signal, detection of the number of rotations of a hub shell relative to a hub axle has been proposed. For example, a bicycle light assembly is disclosed in U.S. Pat. No. 7,410,278, in which a waving circuit is provided for detecting the speed by detecting the number of rotations of a hub shell based on the electrical signal produced by the alternating current generator in the hub.

SUMMARY

Generally, the present disclosure is directed to various features of a bicycle rotation detecting device. One aspect of the present disclosure is to provide a bicycle rotation detecting device that can be easily installed in an existing electrical system of a bicycle. In one feature, the bicycle rotation detecting device is configured to be more freely attached and detached to an electrical component such as a hub dynamo.

In view of the state of the known technology, a bicycle rotation detecting device is provided that comprises a first electrical connector, a second electrical connector, a rotation detecting circuit and an output part. The second electrical connector is electrically connected to the first electrical connector by an electrical path. The rotation detecting circuit detects a waveform of alternating current in the electrical path and produces a rotation detection signal. The output part is electrically connected to the rotation detecting circuit. The output part outputs either the rotation detection signal of the rotation detecting circuit or a signal based on the rotation detection signal of the rotation detecting circuit.

Other objects, features, aspects and advantages of the disclosed bicycle rotation detecting device will become apparent to those skilled in the art from the following detailed description, which, taken in conjunction with the annexed drawings, discloses preferred embodiments of the bicycle rotation detecting device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
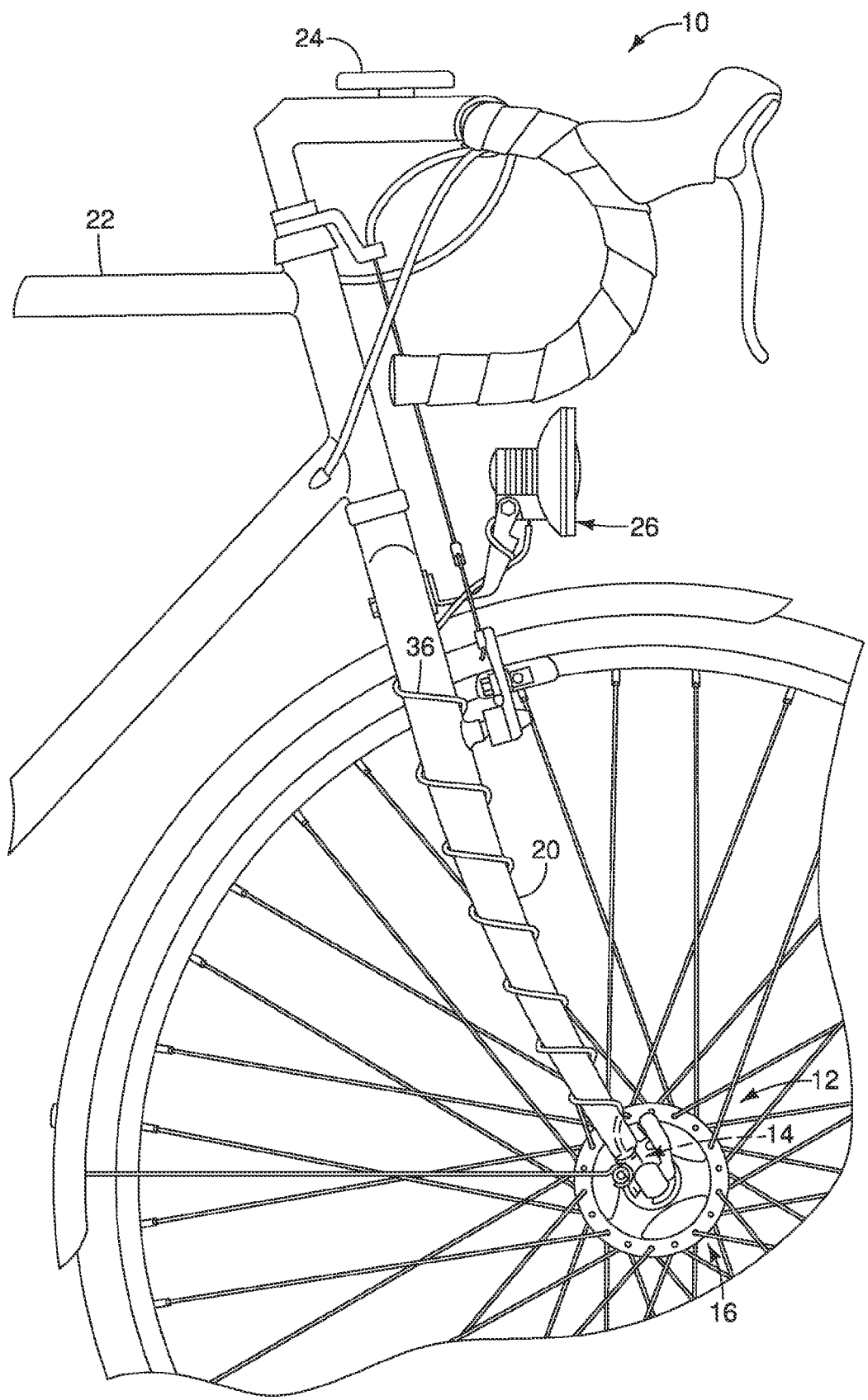
FIG. 1 is a side elevational view of a portion of a bicycle that is equipped with a bicycle apparatus including a hub dynamo, a bicycle rotation detecting device, a bicycle lamp and a cycle computer in accordance with one illustrative embodiment.
Figure 2:
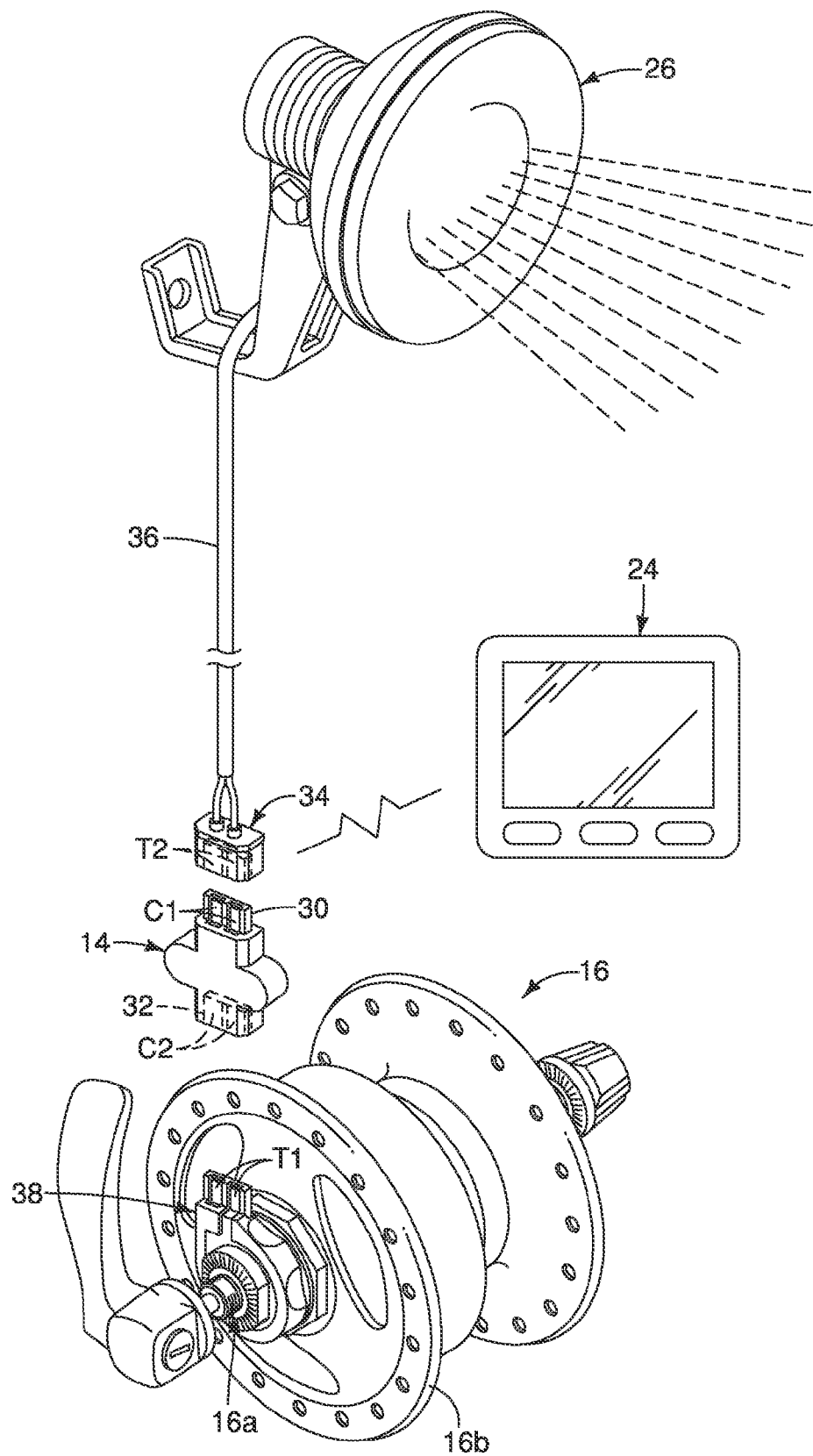
FIG. 2 is an exploded perspective view of the bicycle apparatus that is illustrated FIG. 1.

Referring initially to FIGS. 1 and 2, a front portion of a bicycle 10 is illustrated with a bicycle apparatus 12 in accordance with one embodiment. In the illustrated embodiment, the bicycle apparatus 12 includes a bicycle rotation detecting device 14 and a hub dynamo 16. However, the rotation detecting device 14 can be part of other types of bicycle apparatuses, as needed and/or desired. Here, the hub dynamo 16 forms the center part of a front bicycle wheel 18, which is mounted to a front fork 20 of a bicycle frame 22. The rotation detecting device 14 is mounted on the hub dynamo 16 and is arranged to detect a rotation state of the bicycle wheel 14. In particular, the rotation detecting device 14 detects a portion of the front fork 20 as the bicycle wheel 14 rotates relative to the front fork 20. The rotation detecting device 14 wirelessly communicates with a cycle computer 24, which provides the information from the rotation detecting device 14 to the rider and/or other bicycle components, as needed and/or desired. While the rotation detecting device 14 is shown as wirelessly communicating with the cycle computer 24, it will be apparent from this disclosure that the rotation detecting device 14 can be electrically connected to the cycle computer 24 by electrical wiring.

Figure 3:
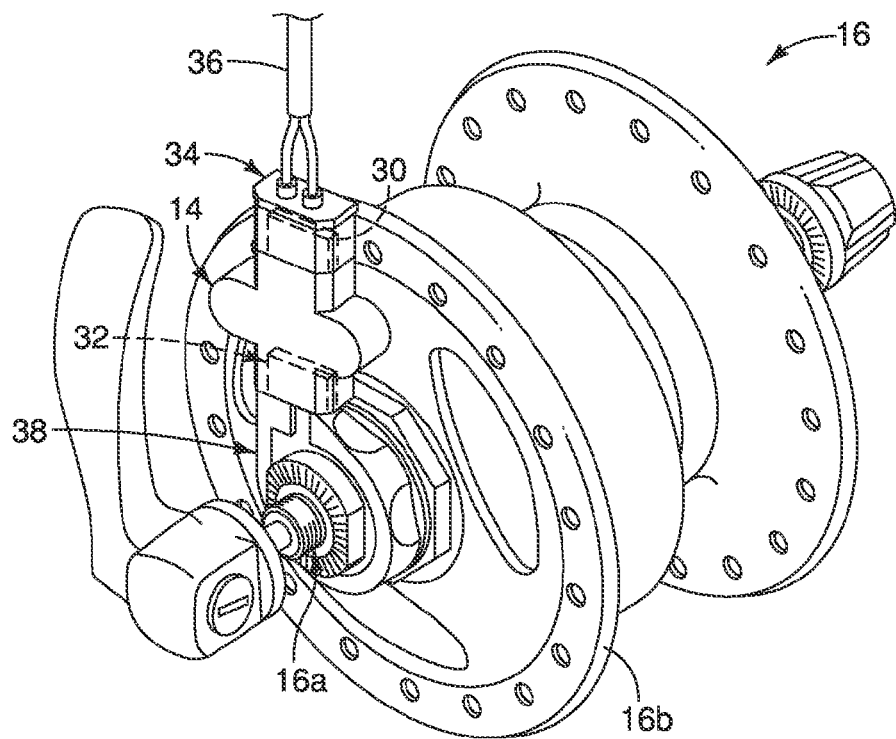
FIG. 3 is a perspective view of the bicycle rotation detecting device plugged directly into an output connector of the hub dynamo and a lamp electrical connector plugged directly into the bicycle rotation detecting device.
Figure 4:
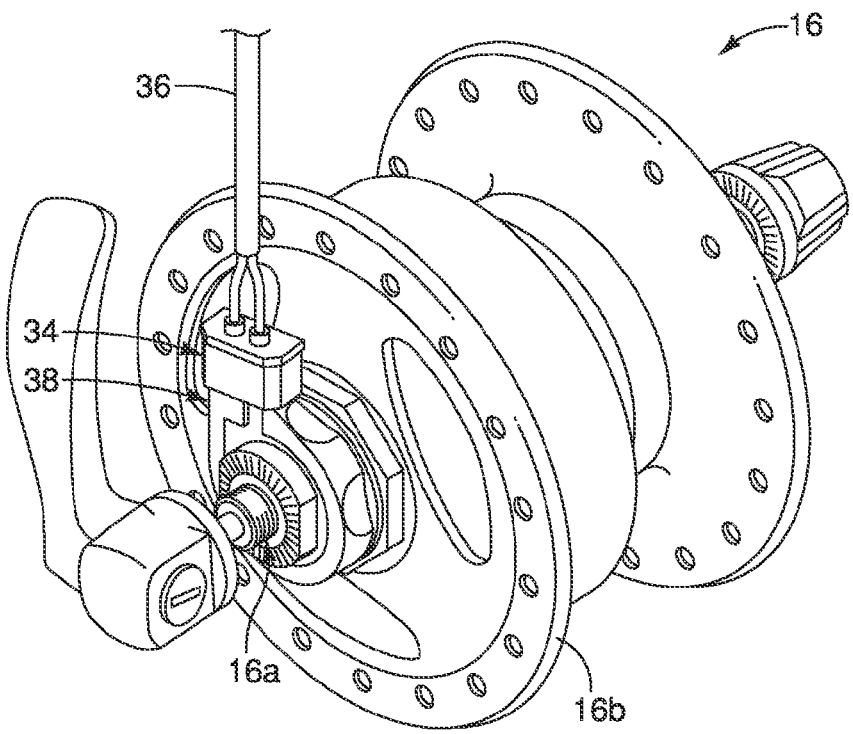
FIG. 4 is a perspective view of the lamp electrical connector plugged directly into the hub dynamo.

As shown in FIGS. 2 to 4, the hub dynamo 16 basically includes a hub axle 16*a* and a hub shell 16*b*. The hub shell 16*b* is rotatably mounted on the hub axle 16*a* by a pair of bearing units in a conventional manner. The hub axle 16*a* includes a quick release arrangement for attaching the hub dynamo 16 to the front fork 20 in a conventional manner. Of course, the quick release arrangement can be replaced with other types of attachment arrangements such as nuts.

Figure 5:
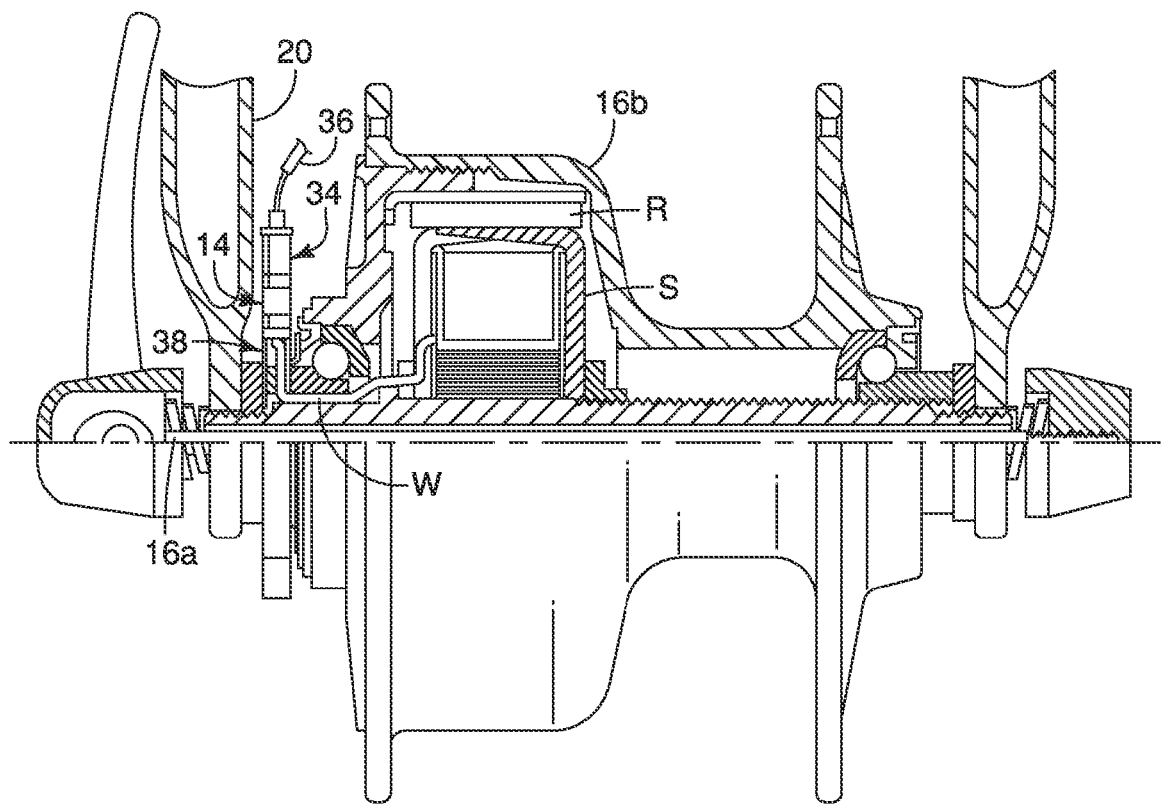
FIG. 5 is a partial longitudinal cross sectional view of the hub dynamo with the hub dynamo mounted to the front fork of the bicycle and the bicycle rotation detecting device plugged into the output connector of the hub dynamo and the lamp electrical connector plugged into the bicycle rotation detecting device.

As seen in FIG. 5, the hub axle 16*a* is provided with a stator S, while the hub shell 16*b* is provided with a rotor R. The rotor R has a plurality of magnetic poles arranged along a circumferential direction of the hub shell 16*b*. The stator S has a coil bobbin with a coil wounded thereon in a conventional manner. The coil is made of a conductive metal wire material, such as a copper wire or an aluminum alloy wire. An electrical cord W has a pair of electrical conductors with one of the conductors connected to one end of the coil of the stator S and the other conductor connected to the other end of the coil of the stator S. Thus, the stator S and the rotor R constitute an alternating current generator that generates electricity by turning the front bicycle wheel 18 and outputs the electricity via the electrical cord W. In particular, the stator S is fixed to the hub axle 16*a*, while the rotor R is fixed to the hub shell 16*b*. As the front bicycle wheel 18 rotates, the hub shell 16*b* and the rotor R rotate together as a unit about the hub axle 16*a*. This rotation of the rotor R relative to the stator S generates electricity in the form of an alternating current that is outputted via the electrical cord W. Since the hub dynamo 16 is a conventional bicycle component, it will not be discussed or illustrated in further detail.

As shown in FIG. 2, the cycle computer 24, has a liquid crystal display capable of displaying travel information of various kinds. The cycle computer 24 includes a control unit having a microcomputer and a wireless communication unit that are housed within the cycle computer 24. This control unit derives travel information of various kinds (e.g. travel velocity or trip distance) based on a wireless communication signal from the rotation detecting device 14. The cycle computer 24 displays travel information of various kinds on the liquid crystal display. Since cycle computer, such as the cycle computer 24, are well known, the cycle computer 24 will not be discussed and/or illustrated in detail herein.

In the first illustrated embodiment, the bicycle apparatus 12 further includes a bicycle lamp 26 that receives electrical power from the hub dynamo 16 via the rotation detecting device 14. In particular, the rotation detecting device 14 includes a first electrical connector 30 with a pair of electrical terminals or contacts C1 in the form of a male electrical connector and a second electrical connector 32 with a pair of electrical terminals or contacts C2 in the form of a female electrical connector. The first electrical connector 30 of the rotation detecting device 14 mates with a lamp electrical connector 34 (a female electrical connector) that is electrically connected to the bicycle lamp 26 by an electrical wire 36. The second electrical connector 32 of the rotation detecting device 14 mates with an output electrical connector 38 (a male electrical connector) of the hub dynamo 16. In the first illustrated embodiment, the first electrical connector 30 is a male electrical connector, while the second electrical connector 32 is a female electrical connector. Of course, it will be apparent from this disclosure that the first electrical connector 30 could be a female electrical connector, and the second electrical connector 32 could be a male electrical connector if the lamp electrical connector 34 was a male electrical connector and if the output electrical connector 38 was a female electrical connector.

The lamp 26 constitutes an electrical component having the lamp electrical connector 34 (i.e., a third electrical connector) that selectively mates with the output electrical connector 38 of the hub dynamo 16 and the first electrical connector 30. Thus, the lamp electrical connector 34 can be connected directly to the output electrical connector 38 of the hub dynamo 16 as seen in FIG. 4. Alternatively, the lamp electrical connector 34 can be connected directly to the first electrical connector 30 of the rotation detecting device 14, and the second electrical connector 32 of the rotation detecting device 14 is connected directly to the output electrical connector 38 of the hub dynamo 16 as seen in FIG. 3. In either case, the lamp 26 receives electrical power from the hub dynamo 16. The first and second electrical connectors 30 and 32 have corresponding configurations that are designed to electrical mate with a connector having a configuration of opposite one of the first and second connectors. The output electrical connector 38 of the hub dynamo 16 and the first electrical connector 30 have identical conductor configurations.

As seen in FIGS. 2 to 5, the output electrical connector 38 is a conventional electrical connector that is fixed to the hub axle 16*a* in a conventional manner. In particular, the output electrical connector 38 has a through hole that receives the hub axle 16*a*, and then a nut is screwed onto the hub axle 16*a* to non-rotatably fix the output electrical connector 38 to the hub axle 16*a*. The output electrical connector 38 has two electrical terminals T1 that are attached to the two conductors of the electrical cord W, respectively. The two electrical terminals T1 of the output electrical connector 38 are configured to selectively mate with the electrical terminals T2 of the lamp electrical connector 34 and the electrical terminals C2 of the second electrical connector 32. Thus, the rotation detecting device 14 is detachable and reattachable to the lamp electrical connector 34 and the output electrical connector 38.

Figure 6:
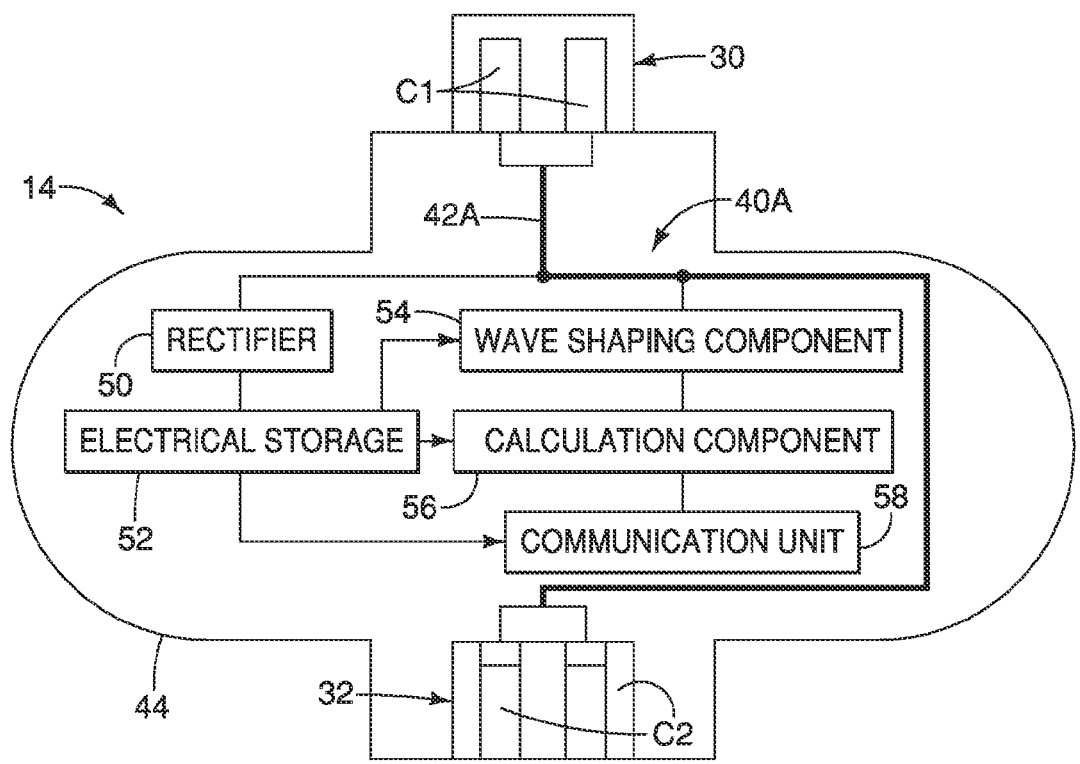
FIG. 6 is a schematic view of the bicycle rotation detecting device that schematically illustrates the structure of the bicycle rotation detecting device in which the alternating current of the hub dynamo is outputted as alternating current.
Figure 7:
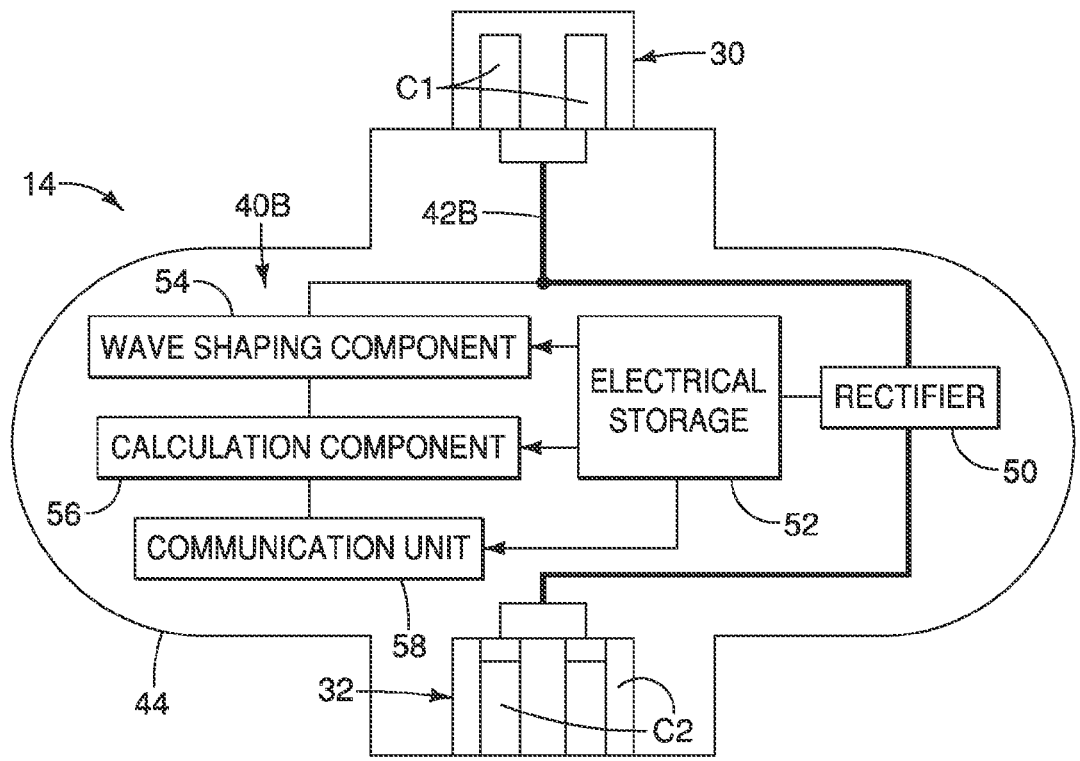
FIG. 7 is a schematic view of the bicycle rotation detecting device that schematically illustrates the structure of the bicycle rotation detecting device in which the alternating current of the hub dynamo is outputted as direct current.

As seen in FIGS. 6 and 7, the rotation detecting device 14 can be configured to output alternating current (AC) as shown by the circuitry of FIG. 6, or can be configured to output direct current (DC) as shown by the circuitry of FIG. 7. In the circuitry of FIGS. 6 and 7, like reference numerals refer to like elements for the sake of brevity. In each case, as mentioned above, the first electrical connector 30 mates with the output electrical connector 38 of the hub dynamo 16 for receiving electricity, while the second electrical connector 32 mates with the lamp electrical connector 34 of the lamp 26 for outputting electricity.

Referring to FIG. 6, the bicycle rotation detecting device 14 is schematically illustrated to show the structure of the bicycle rotation detecting device in which the alternating current of the hub dynamo 16 is outputted as alternating current. In the case of outputting alternating current (AC), as shown in FIG. 6, the rotation detecting device 14 includes a rotation detecting circuit 40A and an electrical path 42A. The electrical path 42A directly connects the electrical terminals C1 to C2 together. In other words, the rectifier 50 is connected to the electrical path 42A such that the alternating current is supplied to the second electrical connector 32 from the first electrical connector 30. In this way, the second electrical connector 32 is electrically connected to the first electrical connector 30 by the electrical path 42A so that the alternating current from the hub dynamo 16 is not rectified to direct current. The rotation detecting device 14 includes a housing 44 that supports the first and second electrical connectors 30 and 32 and the electrical path 42A as a single unit. Alternatively, the first and second electrical connectors 30 and 32 can have separate housings that are connected by the electrical path 42A. The rotation detecting circuit 40A further includes a rectifier 50 and an electrical storage 52. The rectifier 50 converts the alternating current from the hub dynamo 16 to direct current. The rectifier 50 is electrically connected to the electrical storage 52 such that the electricity generated by the hub dynamo 16 is stored in the electrical storage 52.

Referring now to FIG. 7, the bicycle rotation detecting device 14 is schematically illustrated to show the structure of the bicycle rotation detecting device 14 in which the alternating current of the hub dynamo 16 is outputted as direct current. In the case of outputting direct current (DC), as shown in FIG. 7, the rotation detecting device 14 includes a rotation detecting circuit 40B and an electrical path 42B that are disposed in the housing 44 with the electrical path 42B including the rectifier 50. More specifically, the rectifier 50 is electrically connected to the electrical path 42B to convert the alternating current from the electrical path 42B to direct current. In other words, the rectifier 50 is disposed in the electrical path 42B such that the direct current is supplied to the second electrical connector 32 from the first electrical, connector 30. In this way, the second electrical connector 32 is electrically connected to the first electrical connector 30 through the rectifier 50 by the electrical path 42A so that the alternating current from the hub dynamo 16 is rectified to direct current before reaching the second electrical connector 32. The rotation detecting circuit 40B also includes the electrical storage 52 which is electrically connected to the electrical storage 52 such that the electricity generated by the hub dynamo 16 is stored in the electrical storage 52.

The electrical storage 52 can be, for example, a capacitor. Alternatively, the electrical storage 52 could include a battery, such as a nickel-cadmium cell, lithium ion cell, or nickel-hydrogen cell, rather than a capacitor. In any case, the electrical storage 52 is electrically connected between the rectifier 50 and the rotation detecting circuit 40A or 40B to receive the direct current from the rectifier 50 and to supply power the rotation detecting circuit 40A or 40B.

Each of the rotation detecting circuits 40A and 40B further includes a wave shaping component 54 and a calculating component 56. The wave shaping component 54 and the calculating component 56 are both electrically connected to the electrical storage 52 such that the electricity stored in the electrical storage 52 is used to operate the wave shaping component 54 and the calculating component 56. Basically, the waving shaping component 54 processes a wave signal of the alternating current produced by the hub dynamo 16 in the electrical path 42A or 40B. The calculating component 56 produces the rotation detection signal based on the processing of the wave signal of the alternating current. More specifically, the wave signal is transmitted to the calculating component 56, which calculates the number of rotations of the hub shell 16b per a unit of time to produce the rotation detection signal.

The wave shaping component or circuit 54 is also sometimes called a wave fairing part or a wave shaper. In any case, the wave shaping component 54 detects the sinusoidal wave signal of the alternating current changes the sinusoidal wave signal to pulse signals. The wave shaping component 54 converts the electrical signal (sine wave) from the alternating current produced by the hub dynamo 16 into a pulsed signal (rectangular wave) or speed signal. This hub dynamo 16 or speed signal is output from the wave shaping component 54 to the calculating component 56. The wave shaping circuitry of the wave shaping component 54 can, for example, includes a full bridge of diode or half bridge diode and transistor. The wave shaping component 54 preferably includes a diode connected to the output of the hub dynamo 16 and a transistor. The diode controls the ON and OFF states of the transistor. The output of the diode is connected to the base of the transistor, while a speed pulse signal is outputted from the collector of the transistor to the calculating component 56. The calculating component 56 then computes the number of rotations of the hub shell 16b according to the input of the speed pulse signal.

The calculating component 56 can be any type of device that can count the pulses from the wave shaping component 54 and output a corresponding signal that provides a number of pulses per unit of time. For example, the calculating component 56 can be frequency counter such as an integrated circuit that includes a counter and a timer.

Preferably, the rotation detecting device 14 includes a communication unit 58. In the first illustrated embodiment, the communication 58 is a wireless communication unit. The communication unit 58 is electrically connected to the electrical storage 52 such that the electricity stored in the electrical storage 52 is used to operate the communication unit 58. The communication unit 58 transmits a signal indicative of the number of rotations of the hub shell 16b per a unit of time to the cycle computer 24 and/or components as needed. The communication unit 58 outputs an output signal based on the rotation detection signal of the rotation detecting circuit 40A or 40B. In particular, the communication unit 58 outputs a speed signal produced by the calculating component 56 based on the rotation detection signal of the rotation detecting circuit 40A to the cycle computer 24 and/or components. Alternatively, the communication unit 58 directly outputs the rotation detection signal produced by the wave shaping component 54 of the rotation detecting circuit 40A to the cycle computer 24, which will then calculate the number of rotations of the hub shell 16b per a unit of time. Thus, the communication unit 58 constitutes an example of an output part of the rotation detecting device 14.

Figure 8:
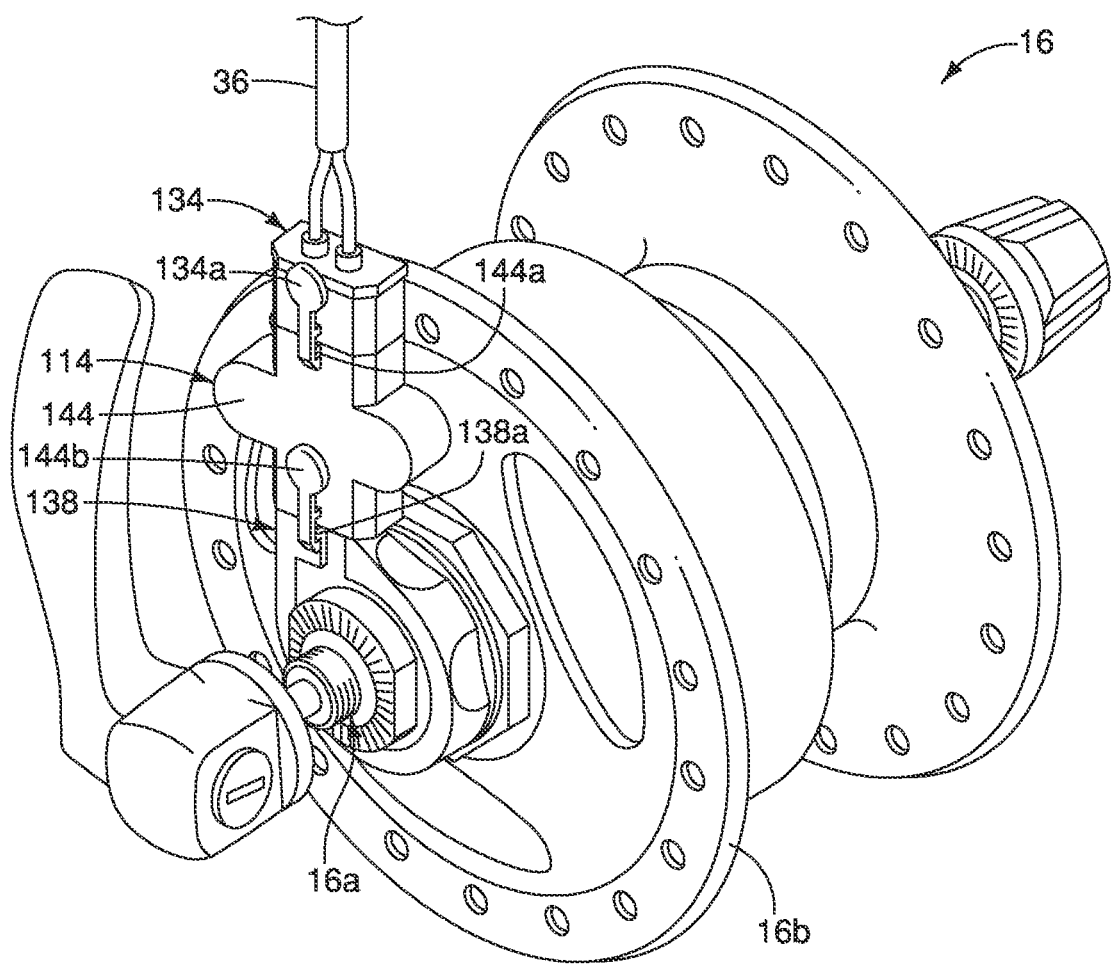
FIG. 8 is a perspective view, similar to FIG. 3, of an alternate housing of the bicycle rotation detecting device having an engagement (latching) arrangement for securely holding the first and second connectors of the bicycle rotation detecting device to the lamp electrical connector and the output connector of the hub dynamo.

Referring to FIG. 8, an alternate housing of a bicycle rotation detecting device 114 is illustrated that interconnects a modified lamp electrical connector 134 to a modified output electrical connector 138 of the hub dynamo 16. The rotation detecting device 114, the lamp electrical connector 134 and the output electrical connector 138 are identical to the rotation detecting device 14, the lamp electrical connector 34 and the output electrical connector 38, as discussed above, except that they have been modified to include an engagement (latching) arrangement for securely holding the first and second connectors of the bicycle rotation detecting device 114 to the lamp electrical connector 134 and the output electrical connector 138 of the hub dynamo 16. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In particular, the rotation detecting device 114 has a modified housing 144 with an engagement (latching) arrangement for securely holding the first and second connectors of the bicycle rotation detecting device 114 to the lamp electrical connector 134 and the output electrical connector 138 of the hub dynamo 16. The housing 144 includes a catch 144a and a latch 144b. The catch 144a is disposed at one end of the housing 144 that forms a part of one of the first and second electrical connectors, while the latch 144b is disposed at the other end of the housing 144 that forms a part of the other of the first and second electrical connectors. Here, the catch 144a is a protrusion that projects from the housing 144. The latch 144b is a deflectable member that is connected to the housing 144 by a living hinge. In this way, the latch 144b can be resiliently deformed relative to the housing 144 to move between a latching position (essentially a non-deformed state) and a releasing position (a deformed state). The lamp electrical connector 134 is provided with a latch 134a that is identical to the latch 144b so that the latch 134a can engage the catch 144a to securely retain the lamp electrical connector 134 and the rotation detecting device 114 together. The output electrical connector 138 is provided with a catch 138a that is identical to the catch 144a so that the catch 138a can engage the latch 144b to securely retain the output electrical connector 138 and the rotation detecting device 114 together. Thus, the catch 144a has a corresponding configuration that is configured to engage a latch having a configuration of the latch 144b of the housing 144. Likewise, the latch 144b has a corresponding configuration that is configured to engage a catch having a configuration of the catch 144a of the housing 144.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so tong as they do not substantially their intend purpose. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rotation detecting device comprising:
    a housing;
    a first electrical connector supported by the housing at a first location;
    a second electrical connector supported by the housing at a second location with an electrical path disposed in the housing and electrically connecting the first electrical connector to the second electrical connector to conduct electrical power from the second electrical connector to the first electrical connector, the first and second electrical connectors having corresponding configurations that are designed to electrical mate with a connector having a configuration of opposite one of the first and second connectors;
    a rotation detecting circuit disposed in the electrical path between the first and second electrical connector, and detecting a waveform of alternating current in the electrical path and produces a rotation detection signal; and
    an output part supported by the housing and electrically connected to the rotation detecting circuit, the output part outputting either the rotation detection signal of the rotation detecting circuit or a signal based on the rotation detection signal of the rotation detecting circuit.

2. The bicycle rotation detecting device according to claim 1, wherein
    the housing includes a latch disposed adjacent one of the first and second electrical connectors, and a catch disposed adjacent the other one of the first and second electrical connectors, the catch having a corresponding configuration that is configured to engage a latch having a configuration of the latch of the housing.

3. The bicycle rotation detecting device according to claim 1, further comprising
    a rectifier electrically connected to the electrical path to convert the alternating current from the electrical path to direct current.

4. The bicycle rotation detecting device according to claim 3, wherein
    the rectifier is disposed in the electrical path such that the direct current is supplied to the second electrical connector from the first electrical connector.

5. The bicycle rotation detecting device according to claim 3, wherein
    the rectifier is connected to the electrical path such that the alternating current is supplied to the second electrical connector from the first electrical connector.

6. The bicycle rotation detecting device according to claim 3, further comprising
    a battery electrically connected between the rectifier and the rotation detecting circuit to receive the direct current from the rectifier and to power the rotation detecting circuit.

7. The bicycle rotation detecting device according to claim 1, wherein
    the rotation detecting circuit includes:
        a waving shaping component that processes a wave signal of the alternating current; and
        a calculating component that produces the rotation detection signal based on the processing of the wave signal of the alternating current.

8. The bicycle rotation detecting device according to claim 7, wherein
    the output part includes a communication unit that outputs an output signal based on the rotation detection signal of the rotation detecting circuit.

9. The bicycle rotation detecting device according to claim 1, wherein
    the output part includes a communication unit that outputs an output signal based on the rotation detection signal of the rotation detecting circuit.

10. The bicycle rotation detecting device according to claim 9, wherein
    the communication unit is a wireless communication unit.

11. A bicycle apparatus comprising:
    a hub dynamo having an output electrical connector; and
    a bicycle rotation detecting device including
        a housing;
        a first electrical connector that mates with the output electrical connector of the hub dynamo and being supported by the housing at a first location;
        a second electrical connector supported by the housing at a second location with an electrical path disposed in the housing and electrically connecting the first electrical connector to the second electrical connector to conduct electrical power from the second electrical conductor to the first electrical conductor, the first and second electrical connectors having corresponding configurations that are designed to electrical mate with a connector having a configuration of opposite one of the first and second connectors;

a rotation detecting circuit disposed in the electrical path between the first and second electrical connector, and detects a waveform of alternating current in the electrical path and produces a rotation detection signal; and an output part supported by the housing and electrically connected to the rotation detecting circuit, the output part outputting either the rotation detection signal of the rotation detecting circuit or a signal based on the rotation detection signal of the rotation detecting circuit.

12. The bicycle apparatus according to claim 11, wherein the output electrical connector of the hub dynamo and the second electrical connector have identical conductor configurations.

13. The bicycle apparatus according to claim 12, further comprising an electrical component having a third electrical connector that selectively mates with the output electrical connector of the hub dynamo and the second electrical connector.

14. The bicycle rotation detecting device according to claim 1, wherein the first and second locations of the first and second electrical connectors are located on the opposite sides of the housing.

15. The bicycle rotation detecting device according to claim 11, wherein the first and second locations of the first and second electrical connectors are located on the opposite sides of the housing.

* * * * *